United States Patent [19]

Huh

[11] Patent Number: 5,687,273

[45] Date of Patent: Nov. 11, 1997

[54] TUNING DATA SHARING APPARATUS AND A METHOD THEREOF FOR A TELEVISION/ VIDEO CASSETTE TAPE RECORDER

[75] Inventor: Chung Hyoea Huh, Kyungki-Do, Rep. of Korea

[73] Assignee: Goldstar Co., Ltd., Seoul, Rep. of Korea

[21] Appl. No.: 365,942

[22] Filed: Dec. 29, 1994

[30] Foreign Application Priority Data

Dec. 30, 1993 [KR] Rep. of Korea ............ 1993-31404

[51] Int. Cl.$^6$ .................. H04N 5/91; H04N 7/00
[52] U.S. Cl. .............. 386/46; 386/83; 348/731; 348/732; 455/185.1; 455/186.1
[58] Field of Search ............... 348/5, 705, 706, 348/734, 731, 732; 358/335; 455/185.1, 186.1

[56] References Cited

U.S. PATENT DOCUMENTS 4,495,654  1/1985  Deiss ......................... 455/151
5,293,357  3/1994  Hallenbeck.
5,299,011  3/1994  Choi.

*Primary Examiner*—Andrew Faile
*Assistant Examiner*—Vincent F. Boccio

[57] ABSTRACT

A tuning data sharing apparatus and method for a television/ video cassette tape recorder, includes a first tuner for tuning a broadcasting signal, a first memory for storing a plurality of tuning data, a first microcomputer for transferring the plurality of tuning data stored in the first memory, when a command to store same tuning data is input thereto, a second microcomputer for receiving the plurality of tuning data transferred from the first memory, a second memory for storing the plurality of tuning data transferred from the first memory under a control of the second microprocessor so as to store the same plurality of tuning data in the first and second memories prior to a channel selection, and a second turner for tuning a broadcasting signal using the plurality of tuning data stored in the second memory.

9 Claims, 4 Drawing Sheets

TUNING DATA SHARING APPARATUS AND A METHOD THEREOF FOR A TELEVISION/VIDEO CASSETTE TAPE RECORDER

BACKGROUND OF THE INVENTION

1. Field of the Invention

The present invention relates to a tuning data sharing apparatus and a method thereof for a television/video cassette tape recorder (TV/VCR), and more particularly to an improved tuning data sharing apparatus and a method thereof for the TV/VCR capable of advantageously sharing the tuning data of the TV/VCR in a phase alternation by line (PAL) color television system in which the channel of the broadcasting companies is randomly set up.

2. Description of the Background Art

Referring to FIG. 1, a conventional tuning data sharing apparatus for a TV/VCR includes the first memory 11 for storing a tuning data of a first tuner 13, a first microcomputer 12 for reading the tuning data of the first memory 11 in accordance with an input signal of a channel key signal (or a channel increment/decrement key signal) (not shown) and for outputting a channel selection control signal CS1 corresponding to the read tuning data, the first tuner 13 for selectively outputting an audio/video signal A/V1 or bypassing a high frequency signal RF by detecting a corresponding frequency in accordance with the channel selection control signal CS1, a second memory 21 in which the tuning data of a second tuner 23 of a television in a NTSC (national television system committee) color television system is stored, a second microcomputer 22 for reading the tuning data of the second memory in accordance with an input signal of a channel key signal (or a channel increment/decrement key signal) (not shown) and for outputting a channel selection control signal CS2 corresponding to the read tuning data, the second tuner 23 for detecting a high frequency signal of a corresponding channel from the high frequency signal RF which is bypassed from the first tuner 13 and for outputting an audio/video signal A/V2, and a television 20 including a switch SW1 which is for selecting an output signal of the first and second tuners 13 and 23 in accordance with a control signal L8 of the audio/video signal A/V1 and for transferring the selected output signal to a luminance/chrominance signal processing circuit 24.

The detailed operation of the conventional tuning data sharing apparatus for a TV/VCR will now be explained.

To begin with, in the state that the VCR mode is selected, if the user selects a desired channel from a key signal input section (not shown) of the VCR 10 or a channel increment/decrement key or presses a channel key or a channel increment/decrement key, a signal corresponding to the pressed key is inputted into the first microcomputer 12.

Thereafter, the first microcomputer 12 reads a tuning data among previously stored tuning data of the first tuner 13 and outputs a channel selection control signal CS1 corresponding to the read tuning data to the first tuner 13.

Therefore, the first tuner 13 amplifies the high frequency signal RF of the selected channel corresponding to the read tuning data and mixes the amplified high frequency signal with a signal of an oscillating frequency and outputs the mixed signals as the intermediate audio/video signal A/V1.

Here, the audio/video signal A/V1 is applied to a switching circuit SW1 of the television 20 through a start line connected to a jack of the scart SCART.

That is, the audio/video signal A/V1 is applied to a contact point C1 of the switching circuit SW1 through a predetermined line among the scart lines and at the same time, the signals A/V1 is applied to the switching circuit SW1 as a control signal L8 for the switching circuit SW1.

Thereafter, the contact point C1 of the switching circuit SW1 is turned on and then the signal A/V1 is processed to be displayed on a monitor (not shown) of the television 20 as the broadcasting signal received from the VCR through the antenna ANT.

On the contrary, in the state that the television mode is selected, if the user presses a channel key of the key signal input section (not shown) of the television or a channel increment/decrement key, a signal corresponding to the pressed key is applied to the second microcomputer 22.

At this time, the second microcomputer 22 does not output the channel selection control signal to the first tuner 13, so that the first tuner 13 directly bypasses the high frequency signal (RF) applied thereto to the second tuner 23 of the television 20 via RF Out and RF In.

Thereafter, the second microcomputer 22 reads the corresponding tuning data which is stored in the second memory 21 and outputs the channel selection control signal CS2 corresponding to the read tuning data to the second tuner 23.

Therefore, the second tuner 23 amplifies the high frequency signal RF of the channel corresponding to the read data and outputs the audio/video signal A/V2 of the intermediate frequency by mixing the amplified high frequency signal with a predetermined oscillating frequency. Here, the audio/video signal A/V2 is applied to the switching circuit SW1.

At this time, since the first tuner 13 does not output the audio/video signal A/V1 to the switching circuit SW1 of the television 20 through the scart line connected to a scart jack, the contact point C2 of the switching circuit SW1 is turned on. Thereafter, the audio/video signal A/V2 is inputted into and processed by the luminance/chrominance signal processing circuit 24 and displayed on the monitor (not shown) through the antenna ANT.

However, when the user wants to change channels during recording using the VCR or change channels using the VCR, the user might be confused as to how to control the channel switching because the channel of the broadcasting company for the tuning data stored in the first memory and the channel of the broadcasting company for the tuning data stored in the second memory of the NTSC (national television system committee) type television are different from each other.

Therefore, for preventing such confusion and problems, the user must preset a tuning data of either the VCR or the television so that one tuning data coincides with base data.

SUMMARY OF THE INVENTION

Accordingly, it is an object of the present invention to provide a tuning data sharing apparatus and a method thereof for a television/video cassette tape recorder (TV/VCR) which overcome the problems encountered in the conventional tuning data sharing apparatuses.

It is another object of the present invention to provide an improved tuning data sharing apparatus and a method thereof for the TV/VCR capable of advantageously sharing the tuning data of the TV/VCR in a phase alternation by line (PAL) color television system in which a channel of the broadcasting companies is randomly set up.

To achieve the objects, there are provided a tuning data sharing apparatus for a television/video cassette tape recorder (TV/VCR), which includes a first tuner for tuning a broadcasting signal; a first memory for storing a tuning data of the first tuner; a microcomputer for controlling the first tuner using the timing data stored in the first memory and for outputting the tuning data to a second microcomputer; a second tuner for tuning a broadcasting signal; a second memory for storing the tuning data of the second tuner; and a second microcomputer for controlling the second tuner using the tuning data stored in the second memory and for storing the tuning data of the first memory in the second memory in accordance with a control signal of the first microcomputer.

To achieve the objects, there are provided a tuning data sharing method for a television/video cassette tape recorder (TV/VCR), which comprises a first step which detects whether or not a key input signal is inputted into a first microcomputer in order to share a tuning data; and a second step which, when a key input signal is detected, reads a tuning data of a fast tuner stored in a first memory and outputs the read tuning data and a control signal to a second microcomputer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
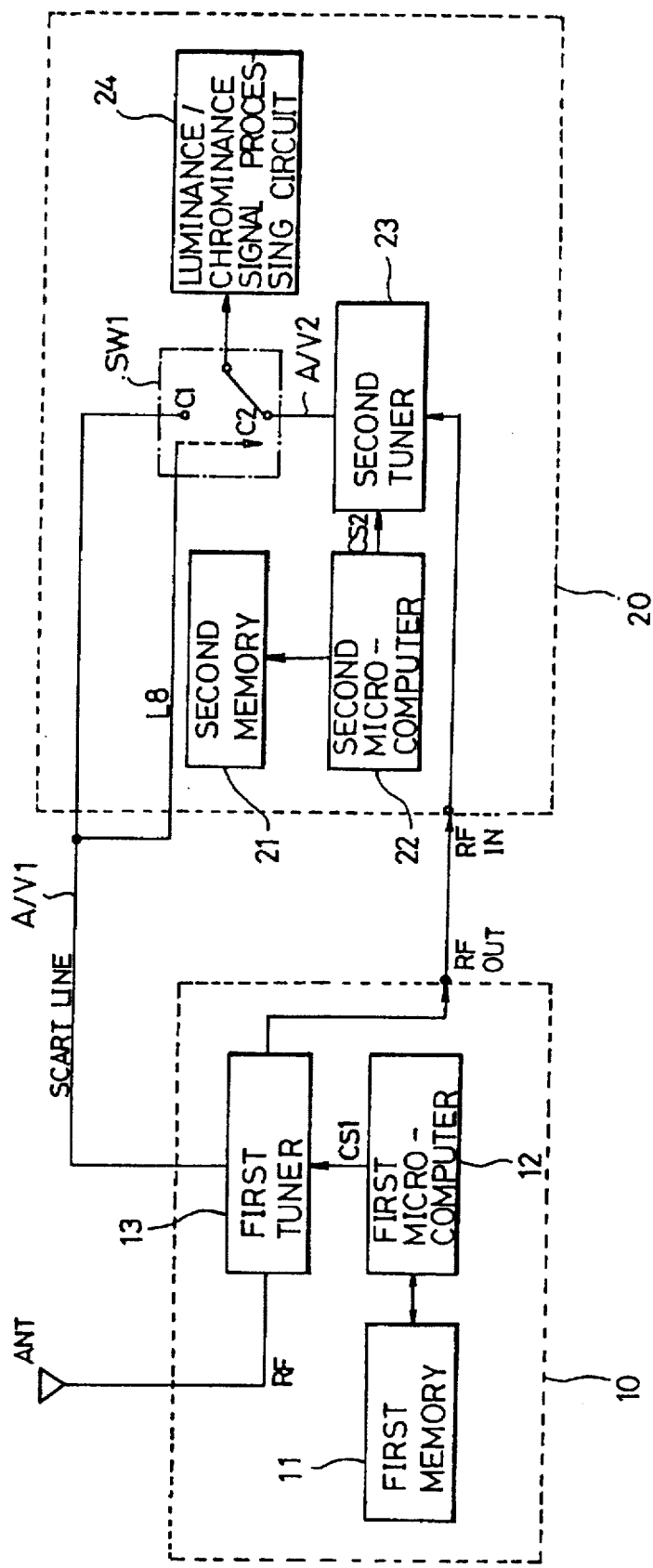
FIG. 1 is a block diagram showing a conventional tuning data sharing apparatus for a television/video cassette tape recorder.
Figure 2:
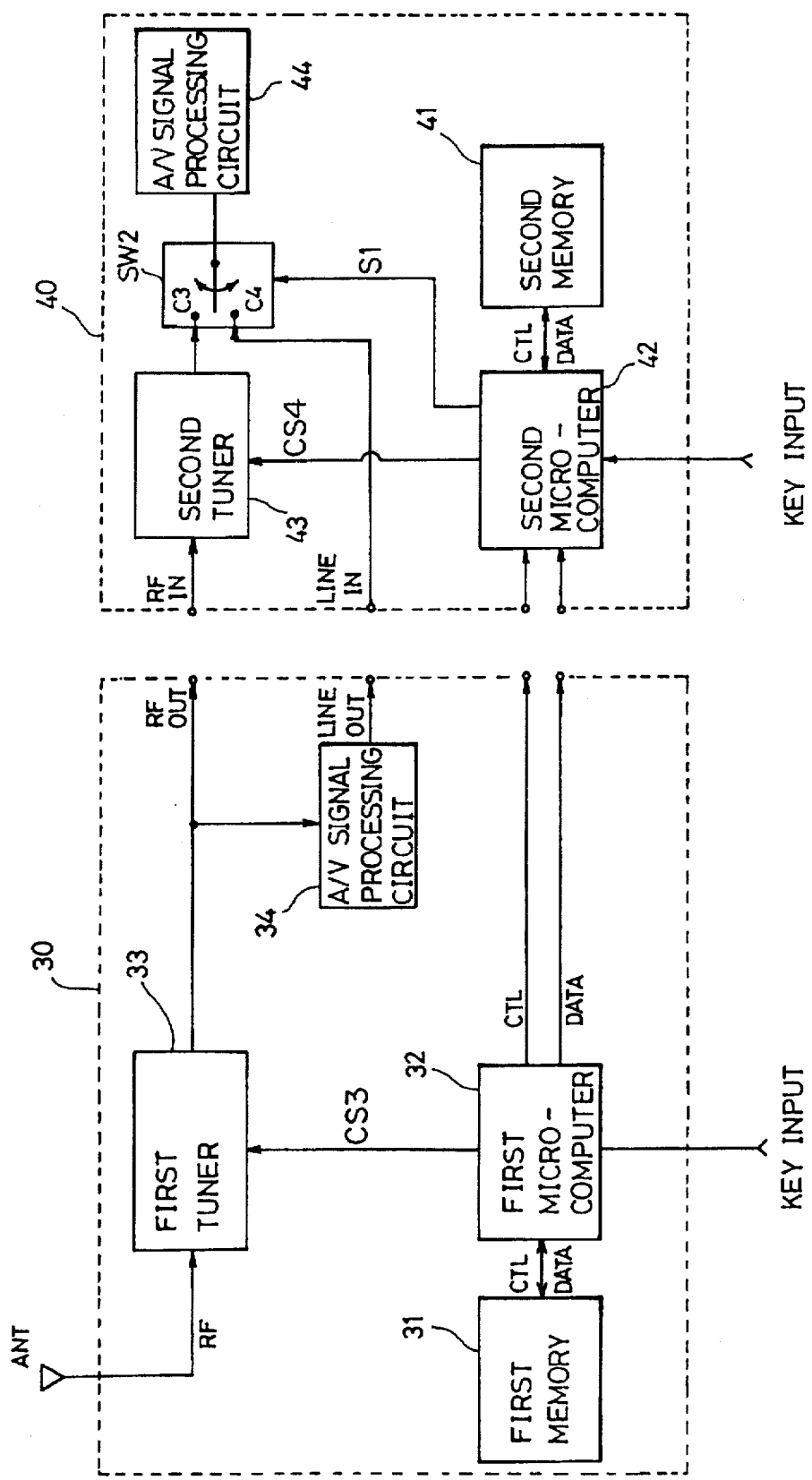
FIG. 2 is a block diagram showing a tuning data sharing apparatus for a television/video cassette tape recorder according to a first embodiment of the present invention.

Referring to FIG. 2, a video cassette tape recorder (VCR) 30 according to a first embodiment of the present invention includes a first memory 31 in which the tuning data of a first tuner 33 is stored therein, a first microcomputer 32 for outputting a control signal CTL to the first memory 31 in accordance with a key input KEY INPUT of a channel key (or a channel increment/decrement key) (not shown) and for reading the tuning data DATA of the first memory 31, and for outputting a channel selection control signal CS3 corresponding to the read tuning data a first tuner 33 for detecting a high frequency of the corresponding channel from the high frequency RF outputted from the antenna ANT and for bypassing the high frequency RF in accordance with the channel selection control signal CS3 of the first microcomputer 32, and an A/V signal processing and displaying circuit 34 for processing the detected signal of the first tuner 33 on a monitor (not shown) of a television 40.

The television 40 includes a second memory 41 in which a timing data of the second tuner 43 is stored therein, a second microcomputer 42 for outputting a control signal to the second memory 41 in accordance with a key input KEY INPUT of a channel key (or a channel increment/decrement key) (not shown), reading the tuning data DATA of the second memory 41, outputting a channel selection control signal CS4 corresponding to the read tuning data, and for storing the tuning data of the first memory 31 into the second memory 41, the second tuner 33 for detecting a high frequency of a corresponding channel from a high frequency RF bypassed from the first tuner 35, and an audio/video (A/V) signal processing circuit 44 for selectively switching between an output signal of the A/V signal processing circuit 34 and an output signal of the second tuner 43 in accordance with a switching control signal S1 of the second microcomputer 42.

Figure 4:
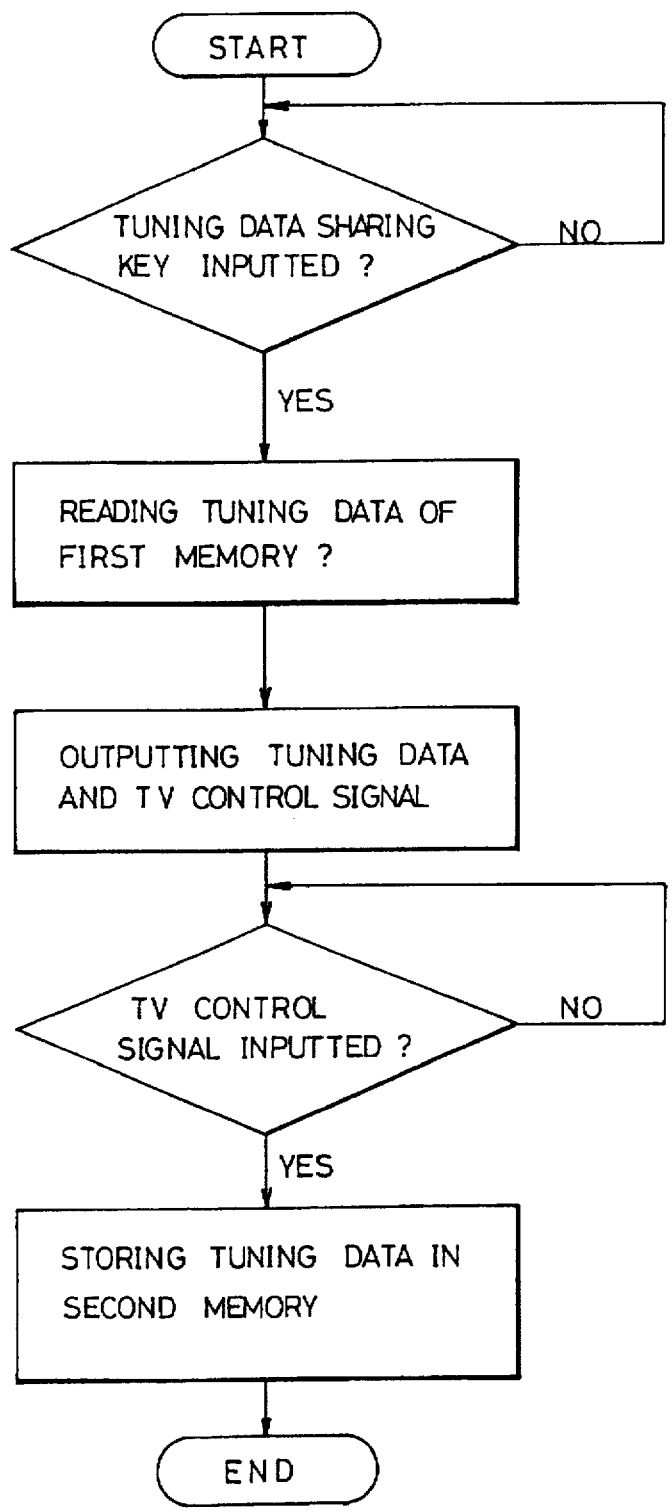
FIG. 4 is a flow chart for explaining a tuning data sharing method for a television/video cassette tape recorder according to the embodiments of the present invention.

The detailed operation of a first embodiment of a tuning data sharing apparatus and a method thereof for a television/video cassette tape recorder will now be explained with reference to FIG. 4.

To begin with, in the state that the television 40 of the PAL type is connected to the VCR 30 through the scart line, the user inputs a key input data KEY INPUT into the first microcomputer 32 in order to share the tuning data of the first tuner 33 of the VCR 30 and the tuning data of the second tuner 43 of the television 40.

Thereafter, the first microcomputer 32 reads the tuning data DATA of the first memory 31 and a television control signal CTL, and outputs the read tuning data DATA and the television control signal CTL to the second microcomputer 42 of the television 40. and Then, the second microcomputer 42 stores all the tuning data of the first memory 31 into the second memory 41 as the television control signal CTL.

Therefore, the first memory 31 of the VCR 30 and the second memory 41 of the television 40 share the same tuning data.

Meanwhile, the first and second microcomputers 32 and 42 can input the tuning data of the first and second tuners 33 and 43 into the first and second memories 31 and 41, respectively.

In this state, if the user inputs key input data KEY INPUT corresponding to a channel key (or a channel increment/decrement key) (not shown) of the VCR 30 into the first microcomputer 32 of the VCR 30, the first microcomputer 32 reads the corresponding data among the tuning data DATA stored in the first memory 31 and outputs the channel selection control signal CS3 corresponding to the read tuning data to the first tuner 33.

Therefore, the first tuner 33 amplifies the high frequency RF of a desired channel and outputs the intermediate frequency by mixing the high frequency signal amplified to a predetermined level with a signal having a predetermined oscillating frequency. The intermediate frequency is inputted into the A/V signal processing circuit 34 and applied to the contact point C4 of the switching circuit SW2 of the television 40 through the scart line which is connected to the scan jack SCART. At this time, the second microcomputer 42 outputs a switching signal S1 to the switching circuit SW2 so that the contact point C4 of the switching circuit SW2 is turned on.

Thereafter, the broadcasting signal outputted from the VCR 30 through the antenna ANT is displayed on the monitor (not shown) of the television 40 because the output signal of the A/V signal processing unit 34 is processed into the signals appropriate for displaying on the monitor of the television 40.

Meanwhile, if an user inputs the key input signal corresponding to a channel key (or a channel increment/decrement key) (not shown) of the television 40 into the second microcomputer 42, the second microcomputer 42 reads the tuning data among the tuning data DATA stored in the second memory 41 which is the same as the tuning data of the first memory 31 in accordance with a control signal CTL, and outputs the channel selection control signal CS4 in accordance with the read tuning data to the second ANT 43.

At this time, the first tuner 33 bypass the RF from the antenna apples it to the second tuner 43 of the television 40. The second turner 43 amplifies the high frequency signal of the desired channel and applies the intermediate frequency to the contact point C3 of the switching circuit SW2 by mixing the amplified high frequency signal with the signal of a predetermined oscillating frequency.

In addition, the second microcomputer 42 outputs the switching control signal S1 to the switching circuit SW2 so that the contact point C3 of the switching SW2 is turned on.

Thereafter, the output signal of the second tuner 43 is inputted into the A/V signal processing circuit 44 and processed into signals appropriate for the broadcasting signal which is received through the antenna ANT.

Meanwhile, as will be apparent to those skilled in the conventional art, it is obvious that the tuning data of the second memory 41 of the television 40 having the same structure as in shown in FIG. 2 is stored in the first memory 41 of the VCR 30, so that the tuning data of the television 40 and the VCR 30 are shared. In addition, as will also be apparent to those skilled in the art, it is obvious that a television can include a first memory 31, a first microcomputer 32, a first tuner 33, and an A/V signal processing circuit 34, and VCR can include a second memory 41, a second microcomputer 42, a second tuner 43, an A/V signal processing circuit 44, and a switching circuit SW2, so that the tuning data of the television 40 and the VCR 30 are shared.

The structure of a tuning data sharing apparatus and a method thereof for a television/video cassette tape recorder according to a second embodiment the present invention will now be explained.

Figure 3:
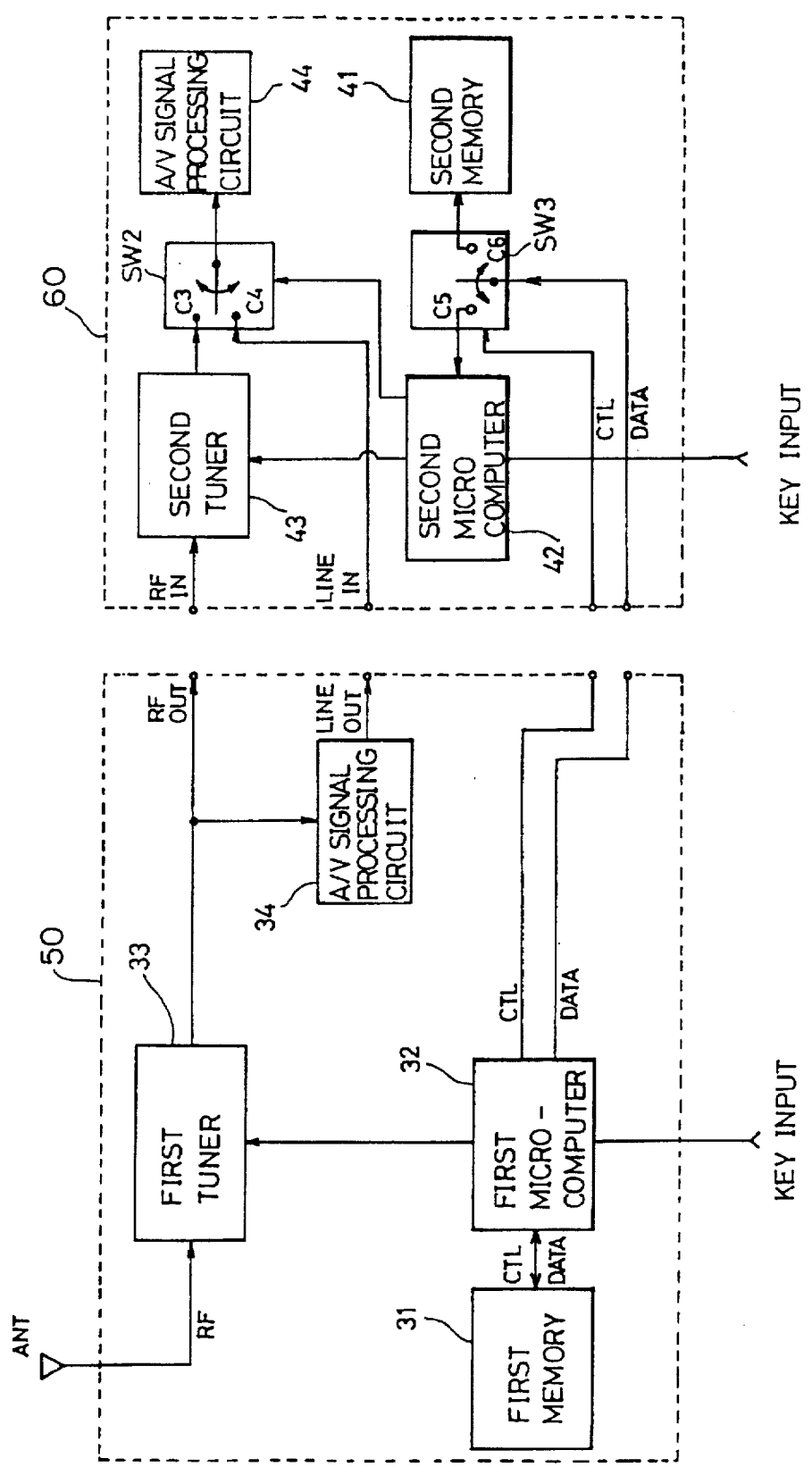
FIG. 3 is a block diagram showing a tuning data sharing apparatus for a television/video cassette tape recorder according to a second embodiment of the present invention.

Referring to FIG. 3, except that the tuning data of the VCR 50 and the television 60 are shared, which is performed when the tuning data DATA of the VCR 50 is selectively stored in either the second memory 41 or the second microcomputer 42 of the television 60 as the control signal CTL of the first microcomputer 32 is inputted into the switching circuit SW3 and not into the second microcomputer 42 of the television 60, the elements thereof are the same as in FIG. 2.

The detailed operation of the tuning data sharing apparatus and the method thereof for the television/video cassette tape recorder according to the second embodiment of the present invention will now be explained.

To begin with, the first microcomputer 32 reads all the tuning data DATA of the first memory 31 as the control signal and outputs the read tuning data DATA and the television control signal CTL to the switching circuit SW3 of the television 40.

At this time, when the television control signal CTL is applied to the switching circuit SW3 so that the contact points C5 and C6 of the switching circuit SW3 are selectively turned on, all the data DATA of the first memory 31 are selectively inputted into the second microcomputer 42 or the second memory 41.

Therefore, the first memory 31 of the VCR 50 and the second memory 41 of the TV 60 share the same tuning data.

In this state, when the user inputs a key input KEY INPUT corresponding to a channel key of the VCR (or a channel increment/decrement key) (not shown) into the first microcomputer 32 of the VCR 50 in order to watch a desired program of the television 60, the first microcomputer 32 reads a desired timing data from the tuning data of the first memory 31 and outputs the channel selection control signal corresponding to the read tuning data to the first tuner 33.

Meanwhile, when the user inputs a key input KEY INPUT corresponding to a channel key of the television (or a channel increment/decrement key) (not shown) into the second microcomputer 42 of the television 60 in order to watch a desired program of the television 60, the second microcomputer 42 reads a desired tuning data from the tuning data of the second memory 41 or the second microcomputer 42, which are the same as the tuning data stored in the first memory 31 and then outputs the channel selection control signal in accordance with the desired tuning data to the second tuner 43. The remaining descriptions thereof as are omitted because they are the same as the ones provided for explaining the second embodiment.

The present invention is directed to sharing the tuning data of the TV/VCR by allowing the tuning data of the VCR to be transferred to the television or by allowing the tuning data of the television to be transferred to the VCR, so that the confusion and misunderstanding in selecting a desired channel can be advantageously prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tuning data sharing apparatus for a television/video cassette tape recorder, comprising:

a first memory for storing a plurality of tuning data;

a first microcomputer for transferring the plurality of tuning data stored in the first memory, when a command to store the same tuning data is input thereto by the user;

a second microcomputer for receiving the plurality of tuning data transferred from the first memory;

a second memory for storing the plurality of tuning data transferred from the first memory under control of the second microprocessor so as to store the same plurality of tuning data in the first and second memories;

tuner means for tuning a broadcasting signal using the plurality of tuning data stored in the first or second memory, said tuner means including a first and second tuner;

said first tuner for tuning the broadcasting signal according to the plurality of tuning data stored in the first memory;

a first audio/video signal processing circuit for processing the tuned signal;

said second tuner for receiving the broadcasting signal bypassed through the first tuner to tune the broadcasting signal using the plurality of tuning data stored in the second memory; and a switch circuit for selecting between an output of the second tuner and an output of the first audio/video signal processing circuit.

2. The apparatus of claim 1, wherein said video cassette tape recorder includes the first memory and the first microcomputer, and said television includes the second tuner, the second memory, and the second microcomputer.

3. The apparatus of claim 1, wherein said television includes the first memory and the first microcomputer, and said video cassette tape recorder includes the second tuner, the second memory, and the second microcomputer.

4. A tuning data sharing apparatus for a televisions/video cassette tape recorder, comprising:

a first memory for storing tuning data;

a first microcomputer for transferring the tuning data stored in the first memory to a second memory with a control signal when a command to share the tuning data is input thereto;

a second microcomputer for controlling the second memory according to the control signal;

the second memory for storing the tuning data transferred from the first memory so as to store the same tuning data in the first and second memories prior to a channel selection;

tuner means for tuning a signal using the tuning data stored in the first or second memory, said tuner means including a first and second tuner;

said first tuner for tuning the signal according to the tuning data stored in the first memory;

an audio/video signal processing circuit for processing the tuned signal;

said second tuner for receiving a broadcasting signal bypassed through the first tuner to tune the bypassed broadcasting signal using the tuning data stored in the second memory; and a switch circuit for selecting between an output of the second tuner and an output of the audio/video signal processing circuit.

5. The apparatus of claim 4, wherein said video cassette tape recorder includes the first memory and the first microcomputer, and said television includes the second tuner, the second memory, and the second microcomputer.

6. The apparatus of claim 4, wherein said television includes the first memory and the first microcomputer, and said video cassette taper recorder includes the second tuner, the second memory, and the second microcomputer.

7. The apparatus of claim 1, further comprising:

a second audio/video signal processing circuit for processing a signal from the output selected by the switch circuit.

8. The apparatus of claim 1, wherein the first microprocessor transfers the plurality of tuning data at one time prior to a channel selection.

9. The apparatus of claim 1, wherein the first microprocessor outputs a control signal to the second microprocessor for controlling storing of the plurality of tuning data in the second memory.

* * * * *